US006462149B1

(12) United States Patent
Tilston et al.

(10) Patent No.: US 6,462,149 B1
(45) Date of Patent: Oct. 8, 2002

(54) CONTROL OF RESIN SPLIT IN SINGLE-REACTOR MANUFACTURE OF BIMODAL POLYOLEFINS

(75) Inventors: Michael W. Tilston, St. Albans; Vinayak Maheshwari, Dunbar; Mark Bradley Davis, Hurricane, all of WV (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 100 days.

(21) Appl. No.: 09/668,232

(22) Filed: Sep. 22, 2000

(51) Int. Cl.[7] ............... C08F 4/64; C08F 4/646; C08F 4/685
(52) U.S. Cl. ............... 526/60; 526/59; 526/113; 526/114; 526/118; 526/119; 526/124.3; 526/160; 526/352; 526/943; 526/116; 525/240
(58) Field of Search ............... 526/59, 60, 113, 526/114, 118, 119

(56) References Cited

U.S. PATENT DOCUMENTS

| | | | |
|---|---|---|---|
| 4,786,697 A | 11/1988 | Cozewith et al. | 526/88 |
| 4,855,371 A | 8/1989 | Job | 526/124 |
| 4,918,038 A | 4/1990 | Samuels et al. | 502/112 |
| 4,937,299 A | 6/1990 | Ewen et al. | 526/119 |
| 4,939,217 A | 7/1990 | Stricklen | 526/114 |
| 5,237,025 A | 8/1993 | Benham et al. | 526/114 |
| 5,442,018 A | 8/1995 | Cann et al. | 526/65 |
| 5,442,020 A | 8/1995 | Davis | 526/127 |
| 5,525,678 A * | 6/1996 | Mink et al. | 525/246 |
| 5,536,796 A * | 7/1996 | Jejelowo et al. | 526/116 |
| 5,539,076 A | 7/1996 | Nowlin et al. | 526/348.1 |
| 5,614,456 A | 3/1997 | Mink et al. | 502/115 |
| 5,624,877 A | 4/1997 | Bergmeister et al. | 502/120 |
| 5,648,439 A | 7/1997 | Bergmeister et al. | 526/96 |
| 5,693,583 A | 12/1997 | Hagerty et al. | 502/115 |
| 5,882,750 A | 3/1999 | Mink et al. | 428/35.7 |
| 5,994,256 A | 11/1999 | Lottes et al. | 502/107 |
| 6,001,766 A | 12/1999 | Kissin et al. | 502/115 |

OTHER PUBLICATIONS

US 5,242,876, 9/1993, Shamshoum et al. (withdrawn)

* cited by examiner

Primary Examiner—David W. Wu
Assistant Examiner—R. Rabago

(57) ABSTRACT

Bimodal resin products are produced in a single reactor by using two bicomponent catalyst compositions, each having a high molecular weight and a low molecular weight component, in different ratios. The HMW/LMW split of the final resin product is controlled accurately by controlling the ratio of the feed of the two bicomponent catalyst compositions. Bimodal or polymodal effects are also achieved for properties or characteristics other than molecular weight. More complex results can be achieved with more than two components. The invention is applicable to a wide variety of polymer products, particularly polyolefins and polyethylene.

20 Claims, 1 Drawing Sheet

CONTROL OF RESIN SPLIT IN SINGLE-REACTOR MANUFACTURE OF BIMODAL POLYOLEFINS

TECHNICAL FIELD

This invention relates to the manufacture of polyolefin resins, and in particular to the manufacture in a single reactor of polyolefin resins having polymodal, especially bimodal, molecular weight, density, or other characteristics. For bimodal effects, it employs two separate bimetallic catalyst compositions fed in ratios which may be varied to control the bimodal properties of the product more closely than has been possible in the past. Additional catalyst species may be employed in more complex processes.

BACKGROUND OF THE INVENTION

The term "bimodal" as applied to polyolefin resins usually means that the resin has two distinct ranges of molecular weight or density, which can impart desired properties to the product in great variety. Originally, bimodal resins were made in two separate reactors or reaction chambers—that is, a product having a first molecular weight was moved directly from the reaction zone in which it was made and introduced to a reaction zone having conditions for making a resin of a different molecular weight, where more resin was made. The two resins are thus mixed or, in some cases, even present in the same particles. Various 2-stage and bimodal processes are reviewed by Cozewith et al in U.S. Pat. No. 4,786,697. Two-stage processes are difficult to control and, perhaps more important, have a capital disadvantage in that two reactors, or at least two reaction zones, are required to make them. Moreover, frequently the products are not homogeneously mixed, in that at least some particles will be entirely of one mode or the other. It is therefore desirable to find ways of making homogeneous bimodal polyolefins in a single reactor.

One approach to making bimodal polyolefins in a single reactor has been to employ a mixed catalyst system, in which one catalyst component (because of specific termination and/or chain transfer kinetics) makes a primarily low molecular weight (LMW) product, and the other catalyst component produces a primarily high molecular weight (HMW) product, because of different termination and/or chain transfer kinetics. By including both of these catalyst components in the same catalyst composition, a bimodal product may be produced; the molecular weight modes of the product will be intimately mixed, providing a resin product that is relatively free of gels compared to similar products made in staged-reactor processes or by the blending of two distinct unimodal resins.

In addition to tailoring the molecular weight distribution of the polymer, the different comonomer incorporation kinetics of specific catalysts can be applied in making products that are bimodal in density. A catalyst with favorable kinetics can incorporate alpha-olefins into polyethylene very effectively. A mixed catalyst system that uses two catalysts having different comonomer incorporation efficiencies can be used to produce such bimodal density products. Producing bimodal products in a single reactor relieves the necessity of a separate blending step, and allows them to be produced more quickly and efficiently.

Controlling the ratio of the components in the bimodal product is a significant manufacturing concern. Product properties of bimodal resins are often extremely sensitive to component split. For instance, in the manufacture of high-density, high-molecular-weight film, to achieve the desired specification requires control of component split within ~2% of the setpoint.

The weight percentage, or "split," of HMW or high density ("HD") in the total product including low density ("LD") components in a single-reactor manufactured bimodal resin is primarily a function of the relative amount of each type of catalyst in the catalyst system. While, theoretically, a catalyst system containing proper amounts of each catalyst could be generated and used to produce the desired split in a particular case, in practice using such a system would be difficult, as the relative productivities of the catalyst components may change with variations in reactor conditions or poison levels.

There have been attempts in the past to control product component split by controlling catalyst split. Disclosed in WO 96/07478 is a method for determining the molecular weight distribution of a bimodal product made in a single reactor, which uses a supported bimetallic catalyst system with the addition of a make-up feed consisting of one of the metallic components. While this scheme can be used to control split, it has a major disadvantage in that the resin produced may contain particles consisting of only one component. The resulting heterogeneity of the resin is known to degrade product film appearance and performance.

Another proposed method for controlling product component split is the use of separate feeds for the HMW and LMW components. This method is most practical in liquid catalyst systems, where the components will become intimately mixed before polymerization begins. This method has a major disadvantage in that the catalyst split is very sensitive to fluctuations in the relative feed rates of each catalyst.

Each of the above described approaches to the problem of making bimodal polyolefins in a single reactor has difficulties and shortcomings. The art is in need of a method of making bimodal products with improved control and convenience.

SUMMARY OF THE INVENTION

One of the most challenging aspects of bimodal (in molecular weight distribution or density) polyolefin production in one reactor is the control of component split. This invention includes the simultaneous use of two multi-component catalyst blends to achieve a desired split control. Preferably, the first blend contains the same catalytic species as the second blend, but in different relative amounts. By simultaneously feeding the two catalyst blends to the reactor and varying the relative feed rates, the resin component split can be controlled at the desired setpoint.

In our invention, we feed two complex catalyst compositions or mixtures (blends), each capable of making both HMW and LMW components, or HD and LD components, or bimodal in some other aspect, such as productivities or reaction rates with respect to a comonomer, but (where the components are the same) having different fixed ratios of catalysts. By controlling the ratio of the two multi-component fixed-ratio catalyst blends, we can modulate or otherwise control the ratio of HMW product to LMW product (or other bimodal feature) rather precisely within a desired range.

By using only mixed catalyst compositions having fixed ratios of catalyst species, we avoid the possible manufacture of particles of only high or low molecular weight. Each particle will be a product of the mixed system. Further, the system is substantially less sensitive to perturbations in catalyst feed rates or feed ratios.

By feeding two distinct catalyst compositions, each having LMW and HMW producing components, the possibility of making particles of only high or only low molecular weight is avoided—all resin particles in this invention will contain both HMW and LMW components. Furthermore, carefully choosing the composition of each catalyst mixed composition will ensure that each resin particle has a HMW-to-LMW ratio that lies in a range known or believed to produce acceptable film or other properties. Our method is effective in controlling the product split (the weight percent of HMW component in the overall product) with supported catalyst systems, spray-dried catalyst systems, or liquid phase catalyst systems.

The wide variety of specific catalysts we can use is illustrated in the following review of catalyst compositions useful in olefin polymerization.

Bimetallic catalysts are described by Kissin et al in U.S. Pat. No. 6,001,766. At least one of the two transition metal compounds they use is a cyclopentadienyl compound, and the resulting catalyst composition is said to produce polymer of broad molecular weight distribution. The ratio of the cyclopentadienyl compound (which preferably includes zirconium) to the other transition metal may vary.

Various other patents owned by Mobil Oil Corporation, such as Mink et al U.S. Pat. No. 5,614,456, Nowlin et al U.S. Pat. No. 5,539,076, Mink et al U.S. Pat. No. 5,525,678, and Mink et al U.S. Pat. No. 5,882,750 describe catalysts said to be useful to make resins having bimodal characteristics. Mink et al in '678 discuss the relative productivities of two metal catalyst sites. Blends of low and high molecular weight resin are said to be made by a titanium-zirconium bimetallic catalyst; various densities and molecular weight distributions are achievable using different conditions and combinations of the catalysts. The Mink et al '750 patent purports to control the high molecular weight fraction of a bimodal product over a wide range, using a metallocene transition metal component and a non-metallocene transition metal component.

Ewen et al, in U.S. Pat. No. 4,937,299, utilize both components in the form of metallocenes having different reactivities; they produce a homopolymer and a copolymer simultaneously. In U.S. Pat. No. 5,242,876, Shamshoum uses a combination of a metallocene and a conventional Ziegler-Natta catalyst to obtain a blend of polymers with different desired properties. Samuels et al U.S. Pat. No. 4,918,038 use combinations of vanadium and/or vanadium oxide or zirconium species. Bergmeister et al in U.S. Pat. Nos. 5,648,439 and 5,624,877 describe a system of two chromium catalysts to make multimodal resin products. Benham et al in U.S. Pat. No. 5,237,025 utilize a chromium and a titanium catalyst to make bimodal (col. 8, line 66) products; however, the two catalytic sites are physically separated. See also Stricklin U.S. Pat. No. 4,939,217, utilizing two different metallocenes with different termination rate constants; they are not used in the same catalyst composition so as to eliminate the possibility of particles without bimodal distribution. A vanadium/zirconium system is used by Samuels et al in U.S. Pat. No. 4,918,038 to obtain a desired molecular weight distribution. Bimetallic metallocenes are used by Davis in U.S. Pat. No. 5,442,020.

A family of mixed metal catalysts is described by Cann et al in U.S. Pat. No. 5,442,018. Although they are described for use in tandem reactors for making bimodal resins, they can be used in our process as well; as described elsewhere herein, the preferred method would be to utilize two of the biselective catalysts, having different ratios of the same catalyst components. An example of a bimodal catalyst composition useful in our invention as described by Cann et al in U.S. Pat. No. 5,442,018 is a mixed metal catalyst comprising a titanium complex that is the reaction product of a titanium-containing compound in which the titanium is in the +3 or +4 oxidation state, a magnesium halide and a first electron donor, and a vanadium complex that is a vanadium-containing compound in which the vanadium is in the +2, +3 +4, or +5 oxidation state optionally reacted with a second electron donor, optionally used with the modifier(s) and the cocatalyst described therein (column 3, line 49–68).

We may use any of the polyselective catalyst compositions described in the above mentioned patents. The patent numbers are hereby repeated, as their entire specifications are incorporated herein by reference: U.S. Pat. Nos. 6,001,766, 5,614,456, 5,539,076, 5,525,678, 5,882,750, 4,937,299, 5,242,876, 5,648,439, 5,624,877, 5,237,025, 4,918,038, 4,939,217, 5,442,018 and 5,442,020. All of these patents disclose the use of a multi-species catalyst systems, most of them referring to the catalysts as bimetallic, but we will call them biselective or polyselective, in that the metals or species are chosen for particular selected properties or functions. In our invention, they may be chosen for producing different molecular weights under the same conditions, or producing resins of different densities, or for having different productivities, perhaps with respect to comonomers, for differing susceptibilities to hydrogen termination, or for other features or properties. While we may use catalysts having three or more such differing functionalities (triselective or polyselective), we prefer to have only two catalyst species in a given catalyst composition.

Our use of polyselective catalysts is not limited to the catalysts described in the above enumerated patents, which does not represent an exhaustive list of such known olefin polymerization catalysts. As our invention comprises a technique for controlling the composite product of a catalyst system, we utilize two or more polyselective catalysts. However, it is preferred to use only two polyselective catalysts, and it is preferred that they will each have the same metal or other active species but in different ratios. For our purposes, a biselective catalyst is one which has two different types of polymerization catalyst species in the same catalyst composition; a polyselective catalyst is one which has two or more different types of polymerization species in the same catalyst composition. Most often, this means that two species are present on the same support. Less frequently, the support itself will act as one of our active catalyst species, and will support a different catalyst species. In either case, since the two species are present in the same composition, and will polymerize the olefin(s) simultaneously, there is little or no chance that resin particles will be made including only one mode of resin product.

While for most purposes we prefer to feed two different solid catalyst compositions, each having at least two metal catalyst components in fixed ratios, it is also possible within our invention to feed a solid bi- or polyselective catalyst composition simultaneously with a liquid bi- or polyselective catalyst composition and/or two bi- or polyselective liquid compositions so long as the liquids are mixed in fixed ratios prior to entering the reactor.

For controlling bimodal molecular weights, our invention preferably employs two mixed (biselective) catalyst compositions, thus overcoming the problem of sensitivity to fluctuations in the relative feed rates for separate HMW and LMW catalysts. For instance, if one biselective catalyst blend independently generates a product with a 70% HMW, 30% LMW split and the other generates a 50% HMW, 50% LMW product, the range of products possible for all relative catalyst feed rates would be from 50 to 70% HMW, compared to a range of 0 to 100% if separate HMW and LMW producing feeds are used. This restriction in the range of possible products significantly reduces the sensitivity of the overall system to perturbations in relative catalyst feed flow rates.

It should be observed that our invention does not include the use of a single polyselective catalyst or a single polyselective catalyst fed simultaneously with a monoselective catalyst. Our invention requires the use of at least two polyselective catalyst compositions. Because we use two or more polyselective catalyst compositions, we are able more precisely to control and/or vary the ratio of product made by one catalyst species to product made by another catalyst species.

Generally, our invention includes a method of controlling the polymodal split of a property of a resin product of an olefin polymerization process comprising conducting the polymerization process in the presence of at least two polyselective catalyst compositions, and controlling the ratio of the polyselective catalyst compositions to each other during the polymerization process to achieve a desired polymodal split of the subject property. The polymodal split may be a bimodal split, in which case the polyselective catalyst compositions are biselective catalyst compositions.

More particularly, our invention includes a method of controlling the bimodal characteristics of polyolefin resin comprising making the polyolefin resin by polymerizing one or more olefins in the presence of two polymerization catalyst compositions A and B, each of the two polymerization catalyst compositions A and B including selected ratios of catalyst species X and catalyst species Y for making polymer molecules of selected characteristics of desired values, and controlling the ratio of the catalyst compositions A and B to each other during the polymerization to obtain a resin product having a desired bimodal split. As an example, catalyst species X may comprise bis(n-butylcyclopentadiene) zirconium dichloride and catalyst species Y may comprise titanium ($Ti^{+3}$ and $Ti^{+4}$) zirconium, Vanadium ($V^{+4}$ and $V^{+5}$), or hafnium.

The feed rates of catalyst compositions A and B may be manipulated in response to continuous or intermittent measurements, or a process model, of the desired product property or properties. The ratio of catalyst species X to catalyst species Y in a given biselective catalyst composition may be selected to provide a specific ratio of product having the property, or value thereof, of interest under a known set of polymerization conditions. The catalyst composition may then be referred to as one which provides a predetermined content, or "split," of, for example, high molecular weights compared to the overall product, which may differ from the weight or molar ratio of the metal components of the catalyst composition.

In principle, any two biselective or other polyselective catalyst compositions may be used in our invention, so long as they have an acceptable degree of effectiveness in imparting the property or properties desired. Typically they will be bimetallic or polymetallic, but they may be biselective or polyselective for reasons other than the type of metal polymerization site. For example, the catalyst components may respond to different promoters or modifiers, and/or they may respond to chain terminators such as hydrogen in different ways or in different degrees. Our invention utilizes the mathematical advantages of the manipulation of two different pairs (or other plurality) of catalyst sites as explained with respect to the equations discussed hereafter.

DETAILED DESCRIPTION OF THE INVENTION

Figure 1:
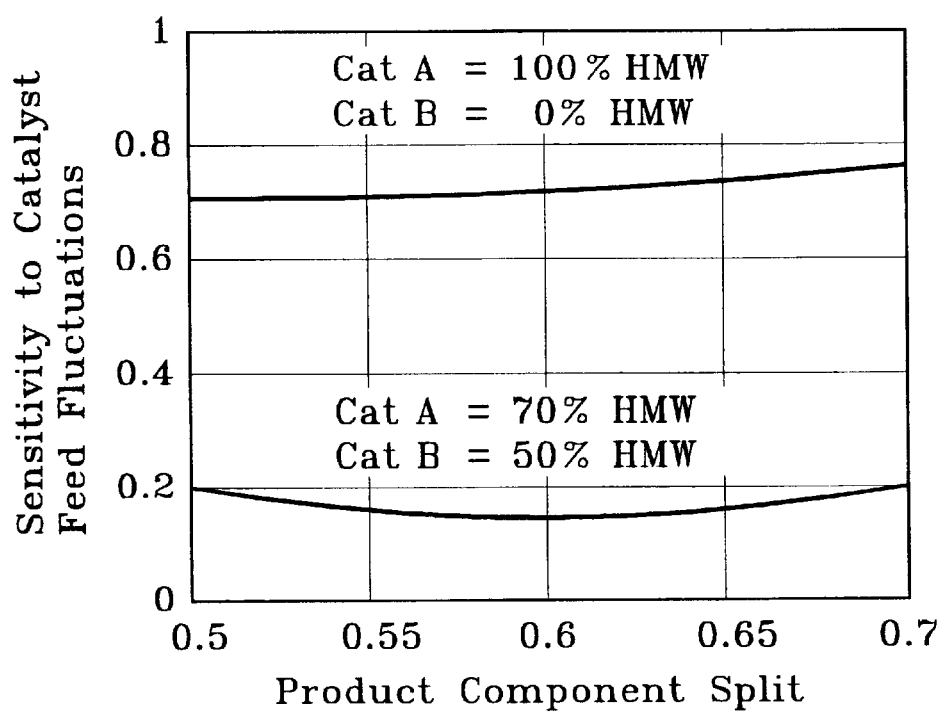
FIG. 1 is a comparison of the present invention to the prior art feeding of separate HMW and LMW catalysts in terms of sensitivity to fluctuations in catalyst feed.

Our invention will be discussed specifically with respect to polyethylene, but it should be understood that the invention can be applied to controlling the component split of any product in which each of two or more different catalyst species generate product components of different average molecular weights, different densities, or different combinations of average molecular weights and densities. The invention is not limited to the regulation of bimodal molecular weights or densities, but may be used for bimodal regulation of other aspects of resin products, such as comonomer introduction, polydispersity, and stereospecificity. Our methodology is applicable in gas-phase fluidized bed, slurry, and solution polymerizations, and is applicable to the polymerization and copolymerization of olefins having from 2 to 8 carbon atoms.

Throughout this specification, HMW means high molecular weight and LMW means low molecular weight. HMW split means the weight fraction of product produced by the HMW generating catalyst. Generally, "split" may be applied to any property of the resin, and means the weight fraction of the resin produced by a polymodal catalyst composition which exhibits the property of interest.

EXAMPLE 1

In a gas phase fluidized bed polymerization, two bicomponent (biselective) catalyst compositions are being fed: catalyst blend A and catalyst blend B, characterized by different selected high molecular weight splits. That is, the two bicomponent catalyst feeds will, when fed independently, produce bimodal products (particles) of different HMW split, where HMW split is defined as the weight fraction of product produced by the HMW generating catalyst. If the feeds are mixed or fed at the same time, therefore, the final product will be a more or less homogeneous mix of particles having a component split (S) of $$S = \frac{w_A f_A P_A + w_B f_B P_B}{f_A P_A + f_B P_B}$$

where $w_A$ is the product HMW split of catalyst feed A, $w_B$ is the product HMW split of catalyst feed B, $f_A$ and $F_B$ are the mass flow rates of catalyst A and catalyst B respectively, and $P_A$ and $P_B$ are the mass productivities of catalyst A and catalyst B (mass of polymer produced/mass of catalyst).

As a further example, bicomponent catalyst compositions A and B may each comprise a Ziegler-Natta component and a metallocene component, or two different Ziegler-Natta components; preferably they will be chemically the same in each composition but present in different ratios. One of them may include a transition metal having an oxidation state of +2, +3, +4, +5 or a mixture of two or more of these. Further, the Ziegler-Natta components of bicomponent catalysts A and B may each comprise a solid complex of at least magnesium, a transition metal and an alkoxide, and the metallocene component is affixed onto each of said Ziegler- Natta component. As is known in the art, such catalysts are to be activated with aluminum alkyls or alumoxanes. Generally, the components of a conventional supported Ziegler-Natta catalyst are an aluminum alkyl and a transition metal compound on an inert support with, optionally, an electron donor. Some of the traditional Ziegler-Natta catalysts include species wherein $TiCl_3$ is supported on a $TiCl_3$ catalyst. Any of the conventional heterogeneous Ziegler-Natta transition metal compound catalyst components for producing polyolefins can be used in the present invention. The compound may be of the general formula $MR_X$ where M is the metal, R is a halogen or a hydrocarboxyl and X is the valance of the metal. Preferably, M is a Group IVB, VB, or VIB metal, more preferably a Group IVB, and most preferably titanium. Preferably R is chlorine, bromine, an alkoxy or a phenoxy, more preferably chlorine or ethoxy and most preferably chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present. The transition metal compound is supported on an inert solid which is chemically unreactive with any of the components of the heterogeneous or homogeneous catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide and carboxylates of magnesium. The aluminum alkyl is of the general formula $AlR_3$ where R is an alkyl of from 1–8 carbon atoms and each R may be the same or different. Examples of aluminum alkyls are trimethyl aluminum (TMA), triethyl aluminum (TEAl) and triisobutyl aluminum (TiBAl). The preferred aluminum alkyl is TEAl. The electron donor is any one of the electron donors which are effective with conventional supported Ziegler-Natta catalysts. Typically, an electron donor is an organosilicon compound. Examples of electron donors are cyclohexylmethyldimethoxysilane (CMDS), diphenyldimethoxysilane (DPMS) and isobutyltrimethoxysilane (IBMS). Other examples of electron donors are disclosed in U.S. Pat. Nos. 4,218,399, 4,395,360, 4,328,122, 4,473,660, 4,562,173, and 4,457,562.

The sensitivities of product split to variations in catalyst feed rate if $f_A$ and $f_B$ have equivalent average control fluctuations is defined as $$\frac{\Delta S}{\delta f} = \sqrt{\left(\frac{\partial S}{\partial f_A}\right)^2 + \left(\frac{\partial S}{\partial f_B}\right)^2}$$

where $$\frac{\partial S}{\partial f_A} = \frac{(w_A - w_B)f_A P_A P_B}{(f_A P_A + f_B P_B)^2}$$

and $$\frac{\partial S}{\partial f_B} = \frac{(w_B - w_A)f_A P_A P_B}{(f_A P_A + f_B P_B)^2}$$

The two catalysts have similar mass productivities of ~5000 g/g catalyst. It is desired to be able to control the product split to values within a HMW split of 0.5 to 0.7. If catalyst A produces a 70% HMW, 30% LMW product and catalyst B produces a 50% HMW, 50% LMW product, the overall product split will be approximately $$S = \frac{0.7 f_A + 0.5 f_B}{f_A + f_B}$$

The overall product split can be controlled between the ranges of 0.5 and 0.7 by varying the relative feed rates of the two catalysts. In a fluidized bed or other system, the manipulation of feed rates may be controlled as a function of measured or modeled values.

Compare this with an unmixed catalyst feed system containing catalyst C and catalyst D, each having a mass productivity of 5000 g/g catalyst. Catalyst C produces a 100% HMW product, and catalyst D produces a 100% LMW product, giving the following expression for product component split:

$$S = \frac{f_C}{f_C + f_D}$$

In this case, split can be controlled between 0.5 and 0.7, yet a more precise catalyst feed control is necessary.

Compare also to a combination of a mixed catalyst E having a 0.7 split used with a single-site catalyst F having a 0% HMW output. Here the possibilities are expressed:

$$S = \frac{0.7 f_E}{f_E + f_F}$$

Again, manipulation of the feed rates may be held between results of 50–70% split, but a full range of HMW component from 0–70% is possible if the system is not accurately controlled. Pockets of homogeneity are quite possible. In our invention both mixed catalysts should produce a split greater than zero.

A comparison of the sensitivities of product split to catalyst feed fluctuations for the mixed dual feed and the non-mixed dual feed systems is shown in FIG. 1 assuming a total feed basis of 1. The sensitivity of product component split to catalyst feed fluctuations, $\Delta S/\delta f$, is shown, where total catalyst feed is 1.

From FIG. 1, it may be seen that the unmixed feeding scheme is much more susceptible (by a factor of ~4) to catalyst feed variations than the mixed feeding scheme of the present invention. With current catalyst feeding techniques, the ability to control split for this invention and other methods is estimated in Table 1 based on a catalyst feed rate uncertainty of ±0.1 on a total feed basis of 1.

TABLE 1.

Ranges and accuracy of various split control methods-$\delta f$= 0.1 total feed = 1.

|  | Split Control Range | Accuracy of Control Method $\Delta S$ |
|---|---|---|
| Single Mixed Catalyst | No catalyst-based split control possible | N/A |
| Unmixed Split Feed - (prior art) | 0–1 | ~ ± 0.08 |
| Mixed Split Feed - (present invention) | 0.5–0.7 | ~ ± 0.02 |

This invention provides the ability to control the resin component split of the final polyethylene or other polyolefin product within a range broad enough to envelop the estimated requirements of the process yet narrow enough to reduce the sensitivity of the product composition to perturbations in catalyst feed rates and to ensure sufficient product homogeneity.

Following are four additional, specific, examples of bimodal catalyst compositions which may be used in our invention, in addition to those disclosed in the above identified patents incorporated by reference. The ratios of the two components may be changed to achieve desired bimodal splits. These catalysts are to be activated by an aluminum alkyl or alumoxane cocatalyst, as is known in the art.

EXAMPLE 2
Preparation of a Ziegler-Natta Component

Magnesium ethoxide (8.6 g, 75 mmol) was slurried into chlorobenzene in an 8 ounce bottle, then 0.40 g o-cresol (3.75 mmol) was added. After stirring for about one (1) minute, 4.11 g of titanium ethoxide (95%, 17.1 mmol) and 1.97 g of titanium tetrachloride (10.4 mmol) were added. The bottle was placed in a 100° oil bath, and then a mixture of ethanol and butanol was quickly added. As the reaction was stirred, it became slightly cloudy with only a few granules of starting material remaining. The cap was removed and a gentle stream of nitrogen was passed for an hour (the liquid volume had decreased by approximately 7%). The slurry was transferred to a glove box and filtered warm. The solids were washed with chlorobenzene, and then with hexane and dried under moving nitrogen. Yield: 10.8 g of off-white powder precursor material consisting mostly of 35$\mu$ spheroids with a small group of 15 $\mu$m particles.

To a 10 gal stainless steel reaction/filter vessel were charged 1892 g of the off-white powder precursor material prepared above, along with 3.5 kg of hexane.

Then, a solution containing about 3.9 kg silicon tetrachloride and 713 g titanium tetrachloride in 6.6 kg of toluene was charged. The slurry was stirred for 30 minutes and then filtered through an internal filter plate. The solids were washed by reslurrying in 15 kg of a 50/50 mixture of hexane and toluene then isolated by filtration. In a like manner, the solids were then washed twice with hexane and dried under moving nitrogen. Yield: 2472 g of yellow powder. Analysis: 10.7% Mg, 9.82% Ti, 36.2% Cl. Next a reaction vessel was charged with 1302 g of the yellow powder prepared above along with 5 kg of hexane. Then, 7291 g of 25% ethylaluminum dichloride/toluene was added followed by 1175 g of 1M boron trichloride/heptane solution. After stirring for 30 minutes, the slurry was filtered. The solids were washed once with 50/50 hexane/toluene then twice with hexane and dried overnight under moving nitrogen. Yield: 1068 grams of dark red-brown powder which was the Ziegler-Natta procatalyst component.

Preparation of the Polyselective Catalyst

In a glove box, a round bottom flask was charged with 1 g of (bis(n-butylcyclopentadiene))zirconium dichloride (BuCpZ), 100 cc methylene chloride and a stir bar. When the metallocene had dissolved, about 5 g dark red-brown Ziegler-Natta procatalyst component were added to the solution as a solid. After stirring for about 3 minutes, the volatiles were removed in vacuo to produce about 6 g of a red-brown polyselective catalyst.

EXAMPLE 3
Preparation of Mg/Ti/Zr-containing Catalyst Precursor

About 32.0 grams of ZrCl$_4$ (138 mmol), Zr(OEt)$_4$ (10.2 g, 37.5 mmol) and Zr(OBu)$_4$ (44.0 g, 87.5%, 100 mmol) were mixed with ethanol in a quart bottle. Methyl salicylate (1.9 g, 12.5 mmol) then was added and the mixture stirred overnight at room temperature to obtain a yellow to dark-brown solution. The solution was diluted with 660 g of chlorobenzene and then the bottle was given a quick purge of nitrogen, capped tightly and placed in a 75° C. heating silicone fluid (PDMS, 20 cs) bath and stirred at 440 rpm. When the material temperature reached 95° C., Mg(OEt)$_2$ (85.8 g, 750 mmol) was added. After 3 hours at 95° all of the magnesium ethoxide granules appeared to have dissolved to produce a homogeneous translucent slurry. A gentle nitrogen flow was started and continued for about 4 hours. Heating was then terminated and the reaction mixture was allowed to stir and cool overnight.

The mixture was transferred to a glovebox and filtered using a 600 ml medium frit and a 1 liter vacuum flask. The bottle was rinsed with 200 ml of chlorobenzene which was then used to wash the solids. The solids were then washed 3 times with 250 ml of hexane and sucked dry to produce 94.2 grams of white powder composed of 6–20 $\mu$m granules. Analysis of this magnesium and zirconium containing precursor revealed that it contained about 13.9% Zr, and 13.3% Mg.

The precursor described was slurried in 50 ml of toluene, placed in a 75° oil bath to stir as 110 ml of 25% EADC/toluene was added over about 4 minutes. After stirring for 45 minutes, the mixture was filtered. The solids were washed twice with hexane and dried under moving nitrogen to yield 19.82 g of off white powder. The powder was slurried again in 50 ml of toluene and returned to the 75° oil bath. Over a period of about three minutes, 110 ml of 25% EADC/toluene were added to produce a light gray slurry. After stirring for 45 minutes the mixture was filtered and the solids washed three times with hexane then dried under moving nitrogen. The yield was 16.433 g of grayish-white powder. Analysis of the powder revealed that it contained approximately 9.3% Zr, 10.3% Mg, and 5.3% Al.

Preparation of Mg/Ti/Zr-containing Procatalyst

A procatalyst was prepared by slurrying about 1.63 g of the grayish-white powder described above in toluene and then dropwise adding 2.0 ml of 3% TiCl$_4$/toluene solution. After shaking for an hour at room temperature, the brown slurry was filtered. The solids were washed once with toluene then four times with hexane and dried under moving nitrogen. The yield was 1.43 g of tan powder. Analysis of the powder revealed the presence of about 0.48% Ti, 11.0% Zr, 12.2% Mg, and 3.98% Al.

To produce polyselective catalyst of varying formulations, the above procedure was repeated, using instead 1.5 ml of 3% TiCl$_4$/toluene, to obtain 1.43 g of light tan powder. Analysis revealed the presence of 0.41% Ti, 9.4% Zr, 10.2% Mg, and 3.61% Al. Using instead 1.0 ml of 3% TiCl$_4$/toluene, to obtain 1.37 g of beige powder. Analysis revealed the presence of 0.35% Ti, 11.3% Zr, 12.5% Mg, and 3.74% Al. Using instead 0.5 ml of 3% TiCl$_4$/toluene, to obtain 1.43 g of off-white powder. Analysis revealed the presence of 0.20% Ti, 10.6% Zr, 11.7% Mg, and 3.98% Al.

EXAMPLE 4
Preparation of the Self Supported Cycloalkadienyl Zr Catalyst

To 33 g of the magnesium-zirconium alkoxide catalyst precursor prepared in accordance with Example 2 above (50 mmol of Zr) slurried in 100 ml of toluene were added 177 g of indene (152 mmol). Over the course of 4 minutes were added 115 ml of MMAO/heptane solution (200 mmol Al). The rust brown slurry was filtered after stirring overnight. The solids were washed twice with toluene then twice with hexane and dried under moving nitrogen to yield 40.65 g of tan hybrid precatalyst powder.

Preparation of Polyselective Catalysts Several samples of self supported cycloalkadienyl Zr catalyst prepared as above were modified by shaking, overnight, with small amounts of TiCl$_4$ (0.1–0.8 Ti/Zr as shown in Table 1 below) in a mineral oil slurry. The catalysts were fed into the reactor as mineral oil slurries.

EXAMPLE 5
Preparation of Vanadium Precursor

According to the preparation described in U.S. Pat. No. 5,070,055, 34 g VCl$_3$ (0.216 mol) are added to a flask containing 4 L anhydrous THF. The mixture is stirred for 5 hours at 65° C. under a nitrogen blanket until the VCl$_3$ is dissolved. To this solution are added 550 g silica (dehydrated by heating to 600° C. followed by chemical treatment with 5.5 wt % triethylaluminum) and stirring is continued for 4 hours at 65° C. The flask is vented and the solution is dried to the mud stage at 70° C. The temperature is dropped to 45° C. and a nitrogen purge is for 6 hours or until a 4–10% by weight THF level is reached in the resulting precursor. The vanadium compound so produced is a free-flowing solid which has 0.39 mmoles of vanadium per gram of vanadium compound. The solid (catalyst A) is removed from the flask and stored under nitrogen.

To a flask containing 4 L of anhydrous isopentane are added 500 grams of catalyst A. To this mixture is added with stirring a 25 wt % solution of diethylaluminum chloride as modifier in anhydrous hexane. The amount of diethylaluminum chloride employed was in sufficient amount to give 4% by wt. Al in the final dried solid. The mixture is heated to 45° C. and purged with nitrogen for three hours or until the product is a free flowing powder (catalyst B).

Coimpregnated Catalyst Preparation

To a flask containing 0.226 g MgCl$_2$ (2.5 mmol) dissolved in 30 ml THF are added 10 grams of catalyst B and the mixture is stirred at room temperature until the dark green color of the reduced V$^{<3}$ species appears (typically in 1 hour). The THF is evaporated under vacuum at 65° C. until a pale green free flowing powder is obtained. This is suspended in 35 ml hexane and 0.96 ml (3.06 mmol) zirconium tetra-n-propoxide is added. The mixture is stirred for 30 minutes, then evaporated under vacuum at 65° C. to give catalyst C. Analysis shows 0.229 mmol Mg/g; 0.387 mmol V/g and 0.233 mmol Zr/g solid.

To a flask containing 2.8 g catalyst C are added 10 ml hexane and 3.7 ml (5.9 mmol) of a 25 wt % solution of ethylaluminumdichloride in hexane such that the ethylaluminumdichloride/Zr molar ratio is 9. The mixture is stirred for 45 minutes followed by filtration or decantation washed once with 10 ml hexane and dried until a free flowing yellow powder is obtained (catalyst D). Analysis showed 0.17 mmol Mg/g; 0.24 mmol V/g; and 0.12 mmol Zr/g.

What is claimed is:

1. Method of controlling the polymodal split of a property of a resin product of a polymerization process comprising conducting said polymerization process in the presence of at least two polyselective catalyst compositions, and controlling the ratio of said polyselective catalyst compositions to each other during said polymerization process to achieve a polymodal split of said property.

2. Method of claim 1 wherein said polymodal split is a bimodal split and said polyselective catalyst compositions are solid biselective compositions.

3. Method of claim 1 wherein said polymerization is in a fluidized bed.

4. Method of claim 1 wherein said polymerization is in a slurry.

5. Method of claim 1 wherein said polymerization is in a solution.

6. Method of controlling the bimodal characteristics of polyolefin resin comprising making said polyolefin resin by polymerizing one or more olefins in the presence of two solid polymerization catalyst compositions A and B, each of said two polymerization catalyst compositions A and B including ratios of catalyst species X and catalyst species Y, and controlling the ratio of said catalyst compositions A and B to each other during said polymerization to obtain a resin product having a bimodal split.

7. Method of claim 6 wherein said polyolefin resin is polyethylene.

8. Method of claim 6 wherein said polyolefin resin is a copolymer.

9. Method of claim 6 wherein catalyst species X and Y have the same chemical structure in catalyst compositions A and B.

10. Method of claim 6 wherein catalyst species X and catalyst species Y are present in catalyst composition A in a fixed ratio selected to generate resin product having a ratio of HMW to LMW between 30:70 and 70:30, the ratio of catalyst species X to catalyst species Y in catalyst composition B is a fixed ratio different from that of catalyst composition A, and the ratio of composition A to composition B during polymerization is controlled to achieve a bimodal molecular weight distribution of said polyolefin resin.

11. Method of claim 6 wherein catalyst species X comprises bis(n-butylcyclopentadiene) zirconium dichloride and catalyst species Y comprises titanium (Ti$^{+3}$ or Ti$^{+4}$) zirconium, Vanadium (V$^{+4}$ or V$^{+5}$), or hafnium.

12. Method of controlling the high molecular weight percentage S in a polyolefin resin product made in a fluidized bed comprising (a) selecting a bicomponent catalyst A for making a bimodal resin having a high molecular weight percentage $W_A$, said bicomponent catalyst A having a mass productivity $P_A$, (b) selecting a bicomponent catalyst B for making a bimodal resin having a second high molecular weight percentage $W_B$, said bicomponent catalyst B having a mass productivity $P_B$, and (c) feeding said bicomponent catalysts A and B to said fluidized bed at mass flow rates $f_A$ and $f_B$, whereby the high molecular weight percentage S in said polyolefin resin product is controlled according to the relationship:

$$S = \frac{w_A f_A P_A + w_B f_B P_B}{f_A P_A + f_B P_B}.$$

13. Method of claim 12 wherein said bicomponent catalysts A and B each comprise a Ziegler-Natta component and a metallocene component.

14. Method of claim 13 wherein said Ziegler-Natta components of bicomponent catalysts A and B each comprise a solid complex of at least magnesium, a transition metal and an alkoxide, and wherein said metallocene component is affixed onto each of said Ziegler-Natta components.

15. Method of claim 13 wherein said Ziegler-Natta component and said metallocene component are the same in bicomponent catalysts A and B but are present in different ratios in bicomponent catalysts A and B.

16. Method of claim 12 wherein at least one of said bicomponent catalysts A or B includes a transition metal having an oxidation state of +2, +3, +4, +5 or a mixture thereof.

17. Method of claim 12 wherein at least one of said bicomponent catalysts A or B includes a cyclopentadienyl moiety and a zirconium dichloride moiety.

18. Method of claim 12 wherein at least one of said mass flow rates $f_A$ and $f_B$ is manipulated in response to continuous or intermittent measurements or model of molecular weights in said polyolefin resin product.

19. Method of claim 12 wherein both of said bicomponent catalysts A and B comprise at least two Ziegler-Natta catalysts.

20. Method of claim 19 wherein said Ziegler-Natta catalysts are chemically the same in compositions A and B but are present in different ratios.

* * * * *